(12) United States Patent
Osaki et al.

(10) Patent No.: US 6,779,390 B2
(45) Date of Patent: Aug. 24, 2004

(54) FAILURE DIAGNOSIS APPARATUS FOR EXHAUST GAS RECIRCULATION SYSTEM

(75) Inventors: Satoru Osaki, Hitachinaka (JP); Toshio Hori, Hitachinaka (JP); Osamu Matsuno, Yokohama (JP); Takeshi Tsuyuki, Yokohama (JP)

(73) Assignees: Hitachi, Ltd., Tokyo (JP); Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/304,789

(22) Filed: Nov. 27, 2002

(65) Prior Publication Data

US 2003/0106367 A1 Jun. 12, 2003

Related U.S. Application Data

(62) Division of application No. 09/793,387, filed on Feb. 27, 2001, now Pat. No. 6,508,111.

(30) Foreign Application Priority Data

Apr. 20, 2000 (JP) .................................. 2000-119461

(51) Int. Cl.⁷ .......................................... G01M 15/00
(52) U.S. Cl. ................................................ 73/118.1
(58) Field of Search .......................... 73/116, 117.2, 73/117.3, 118.1; 340/425.5, 438

(56) References Cited

U.S. PATENT DOCUMENTS

| 5,137,004 A | * | 8/1992 | Takahata et al. | 73/116 |
| 5,368,005 A | * | 11/1994 | Kako | 123/568.16 |
| 5,508,926 A | * | 4/1996 | Wade | 701/29 |
| 5,540,091 A | * | 7/1996 | Nakagawa | 73/117.3 |
| 5,542,400 A | * | 8/1996 | Matsumoto et al. | 123/568.16 |
| 5,621,167 A | * | 4/1997 | Fang-Cheng | 123/568.16 |
| 5,653,212 A | | 8/1997 | Hotta et al. | 123/571 |
| 6,044,826 A | * | 4/2000 | Bayerle et al. | 123/568.16 |
| 6,102,015 A | * | 8/2000 | Tsuyuki et al. | 123/568.16 |

FOREIGN PATENT DOCUMENTS

JP   10-115259   6/1998

* cited by examiner

Primary Examiner—Eric S. McCall
(74) Attorney, Agent, or Firm—Crowell & Moring LLP

(57) ABSTRACT

A failure diagnosis apparatus for an exhaust gas recirculation system eliminates the influence of various disturbance factors that vary the suction air pressure, diagnoses a failure of the exhaust gas recirculation system on the basis of the suction air pressure, and prevents incorrect diagnosis. The system includes a fresh air pressure unit for determining an estimated fresh air pressure inside a suction pipe from the operating condition of an internal combustion engine and an actual exhaust gas recirculation pressure estimating unit for determining an EGR gas pressure on the basis of a measured suction pipe pressure detected by a suction pipe pressure detecting unit and estimated fresh air pressure. A failure is judged on the basis of the estimated EGR gas pressure and the detected operating condition.

2 Claims, 17 Drawing Sheets

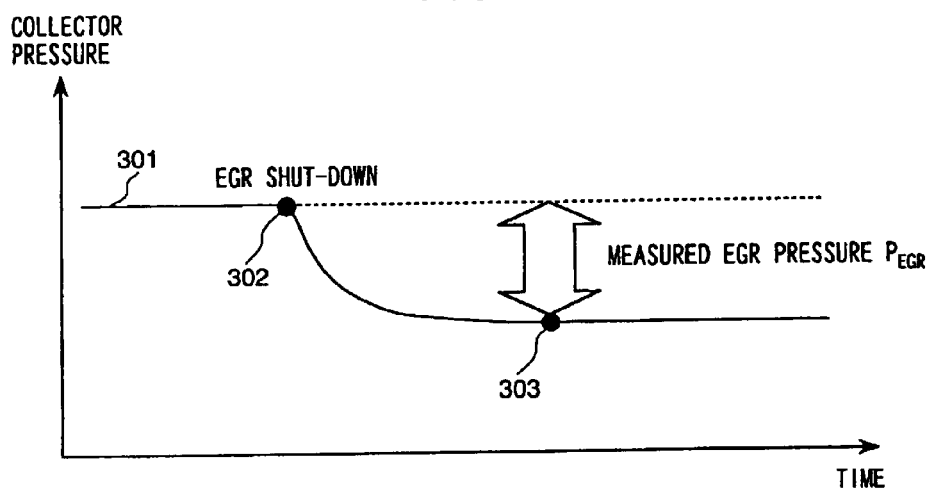
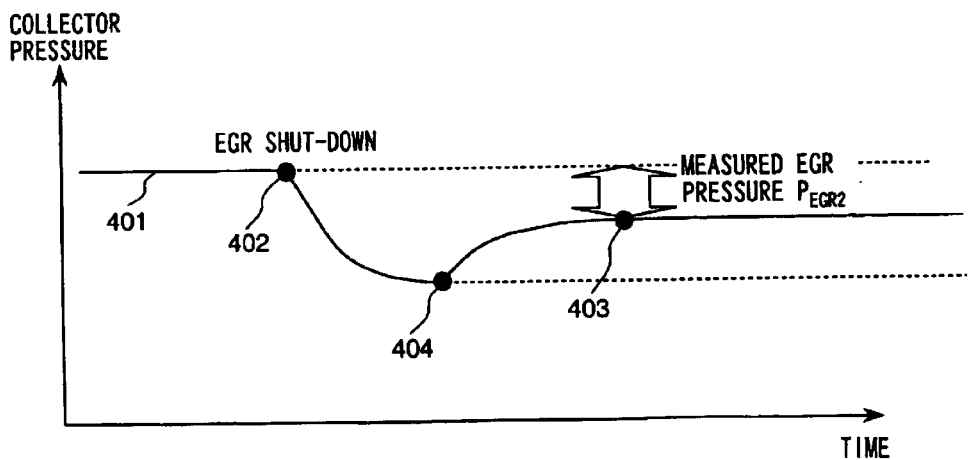

FAILURE DIAGNOSIS APPARATUS FOR EXHAUST GAS RECIRCULATION SYSTEM

This application is a of application Ser. No. 09/793,387, filed Feb. 27, 2001, now U.S. Pat. No. 6,508,111.

BACKGROUND OF THE INVNETION

1. Technical Field

The present invention relates to a failure diagnosis apparatus for an exhaust gas recirculation system of an internal combustion engine.

2. Prior Art

An art disclosed in Japanese Patent Application Laid-Open Publication No. HEI 10-115259 (1998) represents a conventional failure diagnosis apparatus of this type for an exhaust gas recirculation system. FIG. 16 is a block diagram of the functional configuration of a conventional failure diagnosis apparatus for an exhaust gas recirculation system.

Shown in the figure are an EGR valve controlling means 2703, an internal combustion engine condition parameter detecting means 2702, an internal combustion engine condition parameter estimating means 2701, an internal combustion engine condition parameter comparing means 2704 for comparing the detected and estimated internal combustion engine parameters, an EGR flow judging means 2706 for diagnosing an EGR flow on the basis of the above comparison result, and an internal combustion engine condition parameter modifying means 2705 for modifying the internal combustion engine condition parameter estimating means.

When an EGR valve opening is judged greater than a specified value by the EGR controlling means, the actual suction air pressure at that time is detected by the internal combustion engine condition parameter detecting means 2702 and a suction air pressure under the EGR not working is estimated by the internal combustion engine condition parameter estimating means 2701.

A difference in outputs between the above two means represents an EGR pressure. If this pressure is higher than the threshold searched from an atmospheric pressure table, the EGR flow is judged normal. If it is lower than the threshold, the EGR flow is judged lower and faulty.

In the above step, in order to improve the accuracy of the internal combustion engine condition parameter estimating means 2701, the estimated suction air pressure under the EGR not working is adjusted with gains so that the EGR pressure becomes zero under a condition that the EGR valve is almost fully opened.

The above-mentioned failure analysis apparatus for an exhaust gas recirculation system of an internal combustion engine considers that a discrepancy between the measured and estimated fresh air suction pipe pressures is caused by a discrepancy between gains in the fresh air pressure estimating calculation, and accordingly aims to adjust the gains so that the estimated suction pipe pressure under the EGR not working becomes equal to the measured pressure.

However, there are various factors that cause an error in an estimated suction pipe pressure in practice, including dispersion of suction/exhaust temperature, dispersion of post-exhaust-stroke cylinder residual gas pressure, dispersion of actual throttle valve opening area, and error in air-flow meter, and consequently influence on the estimated pressure is different.

For example, because the post-exhaust-stroke cylinder residual gas pressure 2801 is nearly proportional to the atmospheric pressure as shown in FIG. 17, it remains consistent even if the cylinder suction volumetric flow varies. As a result, an estimated pressure error 2803 caused by this dispersion also remains consistent irrespective of the cylinder suction volumetric flow. Besides, the influence of a measurement error of the air-flow meter appears as an error on an intake air flow dependent portion 2807 of the estimated suction pipe pressure.

For the above reasons, there has been a limitation of accuracy in correcting the estimated pressure simply by adjusting the estimated pressure with gains as in the above-mentioned known art.

There has been another problem that, if the EGR gas temperature is lower than expected like in a case that the exhaust gas recirculation system has not yet been warmed up sufficiently and therefore heat of the EGR gas is absorbed by the exhaust gas recirculation system, the EGR flow may be wrongly judged lower and faulty because the actual pressure of the EGR gas becomes lower even if the EGR mass flow is normal.

There has been another problem that, since the purge valve mounted on the suction pipe is operated under a duty control, pulses are caused in the suction pipe pressure by the incoming gas through the valve and the accuracy of diagnosis is badly affected. There remains a further problem that, if purging is stopped during the diagnosis so as to prevent the above, the purge gas discharge increases.

According to the above-mentioned known art, the suction air pressure is sampled at the time when the EGR valve opening area becomes greater than a specified value and the sampled result is judged. Because of this, the diagnosis is commenced as soon as the EGR valve opening area has reached from a fully closed state up to the specified value while the suction pipe has not yet been charged sufficiently with the EGR gas.

The measured suction pipe pressure sampled as above is a pressure at the time when the EGR gas pressure has not yet increased sufficiently. Because of this, the EGR pressure calculated from the measured suction pipe pressure and estimated fresh air pressure results in a smaller value, and consequently there remains a possibility that the EGR flow is wrongly judged lower and faulty.

Since the EGR ratio is generally specified for each operation range, different EGR pressure applies in each operating range. As a result, the normal-state minimum and faulty-state maximum EGR pressures calculated from the difference between the measured suction pipe pressure and the estimated fresh air pressure under the EGR working are also different in each operation range.

Consequently, a threshold for judging the calculated EGR pressure must be specified for each operation range. Because the above-mentioned known art does not consider this point, diagnosis is available only in a limited operation range where a similar threshold applies to the judgment.

Delay of the estimated fresh air pressure is of another problem. Generally, a system configuration in FIG. 7 is used for estimating a fresh air pressure. The estimated fresh air pressure is calculated from a suction air flow, detected by a suction air flow detecting means 902 for measuring the suction air flow of a suction pipe 206, and an engine speed. Since the detected suction air flow contains a suction pulse component, a filtering process is needed to eliminate it.

Since the filtered suction air flow includes a delay as compared to the actual suction air flow, the estimated fresh air pressure 1302 calculated from this air flow is accompanied also with a delay from the actual fresh air pressure 1301. A response delay pressure between the two is proportional to an increase of the suction air flow per unit time. Because of this, if an acceleration/deceleration condition varies at time 1303, a response delay also varies accordingly.

As a result, the EGR pressure calculated by deducting the estimated fresh air pressure 1302 from the measured pressure 1307 contains an error 1311 dependent upon the operating condition. This error causes a problem that, even if the estimated fresh air pressure is corrected by an internal combustion engine parameter modifying means 2705, the estimated value shifts as the operating condition varies.

SUMMARY OF THE INVENTION

An object of the present invention is to provide a failure diagnosis apparatus for an exhaust gas recirculation system which is capable of eliminating the influence of various disturbance factors that vary the suction air pressure, diagnosing a failure of the exhaust gas recirculation system on the basis of the suction air pressure, and preventing wrong diagnosis.

In order to achieve the above objective, a failure diagnosis apparatus for an exhaust gas recirculation system of the present invention has a characteristic feature that the apparatus consists of a fresh air pressure estimating means for calculating an estimated fresh air pressure inside a suction pipe from the operating condition detected of an internal combustion engine, an actual EGR (exhaust gas recirculation) gas pressure estimating means for estimating an EGR gas pressure on the basis of a measured suction pipe pressure detected by the suction pipe pressure detecting means and an estimated fresh air pressure calculated above, and a failure judging means for judging the failure on the basis of the estimated EGR gas pressure and the detected operating condition.

To be more concrete, the present invention provides an apparatus as follows:

The present invention provides a failure diagnosis apparatus for an exhaust gas recirculation system, which, equipped with a suction pipe pressure detecting means for detecting the suction pipe pressure of an internal combustion engine and an operating condition detecting means for detecting the operating condition of the internal combustion engine, diagnoses a failure of the exhaust gas recirculation system of the internal combustion engine on the basis of the detected suction pipe pressure and operating condition; comprising a fresh air pressure estimating means for calculating an estimated fresh air pressure inside the suction pipe from the operating condition detected by the operating condition detecting means; an actual EGR (exhaust gas recirculation) gas pressure estimating means for estimating an EGR gas pressure on the basis of a measured suction pipe pressure detected by the suction pipe pressure detecting means and an estimated fresh air pressure calculated as above; and a failure judging means for judging the failure on the basis of the estimated EGR gas pressure and the detected operating condition.

Preferably, the apparatus comprises an estimated fresh air pressure correcting means for correcting parameters of the fresh air pressure estimating means so that the estimated fresh air becomes consistent with the measured suction pipe pressure when the EGR is not working.

Preferably, the fresh air pressure estimating means calculates the estimated fresh air pressure on the basis of, at least, an engine intake air flow parameter and an engine speed parameter from among the operating condition parameters detected by the operating condition detecting means.

Preferably, the detected operating condition includes an opening area of, at least, one or more of the multiple valves controlling the gas flow into the suction pipe, and the fresh air pressure estimating means calculates the estimated fresh air pressure on the basis of the opening area and the engine speed detected by the operating condition detecting means.

Preferably, the apparatus comprises a cylinder suction air flow calculating means for calculating a cylinder suction air flow from the detected engine suction air flow, and the parameter corrected above is a factor applicable to conversion from the calculated air flow into pressure.

Preferably, the apparatus comprises a cylinder suction air flow calculating means for calculating a cylinder suction air flow from the detected engine suction air flow, and the parameter corrected above is an offset value applicable to conversion from the calculated air flow into pressure.

Preferably, the apparatus comprises a cylinder suction air flow calculating means for calculating a cylinder suction air flow from the detected engine suction air flow, and the parameter corrected above are a factor and an offset value applicable to conversion from the calculated air flow into pressure.

Preferably, the parameter corrected above is a sum of the opening area of one or more of the valves, excluding EGR valve, controlling the air flow into the suction pipe.

Preferably, the apparatus comprises an atmospheric pressure detecting means for detecting the atmospheric pressure, and compensates the estimated fresh air pressure by the detected atmospheric pressure.

Preferably, the apparatus comprises an EGR gas pressure estimating means for estimating the pressure of the EGR gas, which is caused inside the suction pipe when an actual EGR ratio is equal to the target EGR ratio, on the basis of a target EGR ratio in a controlling means of the exhaust gas recirculation system and the estimated fresh air pressure, and the failure judging means judges the failure on the basis of the estimated actual EGR gas pressure and the estimated EGR gas pressure.

Preferably, the apparatus comprises an estimated pressure thermal compensating means for compensating, at least, either one of the estimated fresh air pressure and estimated EGR gas pressure by an estimated suction pipe gas temperature.

Preferably, calculation of the estimated suction pipe gas temperature is based on, at least, the EGR gas temperature and target EGR ratio from among the operating condition parameters detected by the operating condition detecting means.

Preferably, calculation of the estimated suction pipe gas temperature is based on, at least, the EGR gas temperature, outside temperature and target EGR ratio from among the operating condition parameters detected by the operating condition detecting means.

Preferably, a dynamic EGR ratio, which is estimated by compensating the target EGR ratio in terms of EGR gas suction pipe charging delay, is used instead of the target EGR ratio.

The present invention also provides a failure diagnosis apparatus for an exhaust gas recirculation system, which, equipped with a suction pipe pressure detecting means for detecting the suction pipe pressure of an internal combustion engine and an operating condition detecting means for detecting the operating condition of the internal combustion engine, diagnoses a failure of the exhaust gas recirculation system of the internal combustion engine; comprising a determinant value calculating means for calculating a determinant value for judging the failure on the basis of the suction pipe pressure, wherein a threshold for making a failure judgment from the determinant value is specified corresponding to, at least, either one of the engine suction air flow and engine speed detected by the operating condition detecting means.

The present invention also provides a failure diagnosis apparatus for an exhaust gas recirculation system, which, equipped with a suction pipe pressure detecting means for detecting the suction pipe pressure of an internal combustion engine and an operating condition detecting means for detecting the operating condition of the internal combustion engine, diagnoses a failure of the exhaust gas recirculation system of the internal combustion engine on the basis of the detected suction pipe pressure and operating condition; comprising a diagnosis execution condition judging means for commencing the diagnosis on condition that the variation of, at least, one or more parameters influencing the gas flow inside the suction pipe from among the parameters detected by the operating condition detecting means is lower than a specified value and that the condition with lower variation than the specified value has continued for a specified length of time.

Preferably, the diagnosis is commenced on condition that the variation within a specified time of, at least, a throttle valve opening parameter from among the parameters detected by the operating condition detecting means is lower than a specified value and that the condition with lower variation than the specified value has continued for a specified length of time.

Preferably, the diagnosis is commenced on condition that the variation of, at least, a change speed parameter of the throttle valve opening from among the parameters detected by the operating condition detecting means is lower than a specified value and that the condition with lower variation than the specified value has continued for a specified length of time.

Preferably, the diagnosis is commenced on condition that the variation of, at least, an engine speed parameter from among the parameters detected by the operating condition detecting means is lower than a specified value and that the condition with lower variation than the specified value has continued for a specified length of time.

Preferably, the diagnosis is commenced on condition that the variation of, at least, a change speed parameter of the engine speed from among the parameters detected by the operating condition detecting means is lower than a specified value and that the condition with lower variation than the specified value has continued for a specified length of time.

Preferably, the diagnosis is commenced on condition that the variation of, at least, a cylinder suction air flow parameter from among the parameters detected by the operating condition detecting means is lower than a specified value and that the condition with lower variation than the specified value has continued for a specified length of time.

Preferably, the diagnosis is commenced on condition that the variation of, at least, a change speed parameter of the cylinder suction air flow from among the parameters detected by the operating condition detecting means is lower than a specified value and that the condition with lower variation than the specified value has continued for a specified length of time.

The present invention also provides a failure diagnosis apparatus for an exhaust gas recirculation system, which, equipped with a suction pipe pressure detecting means for detecting the suction pipe pressure of an internal combustion engine and an operating condition detecting means for detecting the operating condition of the internal combustion engine, diagnoses a failure of the exhaust gas recirculation system of the internal combustion engine on the basis of the detected suction pipe pressure and operating condition; comprising an exhaust gas recirculation system temperature judging means for judging whether the exhaust gas recirculation system temperature is higher than a specified value or not, and a diagnosis execution condition judging means for commencing the execution on condition that the temperature is judged higher than a specified value.

Preferably, the apparatus comprises an EGR gas temperature detecting means for detecting the temperature of EGR gas flowing inside the exhaust gas recirculation system; and a detected EGR gas temperature judging means, instead of the exhaust gas recirculation system temperature judging means, for judging whether the EGR gas temperature detected by the EGR gas temperature detecting means is higher than a specified value or not.

Preferably, the apparatus comprises, instead of the EGR gas temperature detecting means, an EGR gas temperature estimating means for estimating the EGR gas temperature corresponding to any one of engine speed, cylinder suction air flow, ignition timing and outside temperature parameters from among the parameters detected by the operating condition detecting means.

Preferably, the exhaust gas recirculation system temperature judging means judges whether an estimated total EGR gas heating value, obtained on the basis of the target EGR ratio in the controlling means of the exhaust gas recirculation system and the engine suction air flow detected by the operating condition detecting means, is higher than a specified value, and the estimated total EGR gas heating value is compensated corresponding to either the ignition timing or the outside temperature detected by the operating condition detecting means.

The present invention also provides a failure diagnosis apparatus for an exhaust gas recirculation system, which, equipped with a suction pipe pressure detecting means for detecting the suction pipe pressure of an internal combustion engine and an operating condition detecting means for detecting the operating condition of the internal combustion engine, diagnoses a failure of the exhaust gas recirculation system of the internal combustion engine on the basis of the detected suction pipe pressure and operating condition; comprising an EGR gas temperature judging means for prohibiting diagnosis on condition that, at least, one or more judgment parameters influencing the EGR gas temperature from among the parameters detected by the operating condition detecting means is outside a specified range.

Preferably, at least, suction air temperature is included in the judgment parameters.

Preferably, at least, atmospheric pressure is included in the judgment parameters.

Preferably, at least, ignition timing is included in the judgment parameters.

Preferably, at least, water temperature is included in the judgment parameters.

The present invention also provides a failure diagnosis apparatus for an exhaust gas recirculation system, which, equipped with a suction pipe pressure detecting means for detecting the suction pipe pressure of an internal combustion engine and an operating condition detecting means for detecting the operating condition of the internal combustion engine, diagnoses a failure of the exhaust gas recirculation system of the internal combustion engine on the basis of the detected suction pipe pressure and operating condition; comprising a dynamic EGR ratio calculating means for calculating an estimated dynamic EGR ratio by compensating the target EGR ratio in the exhaust gas recirculation system in terms of suction pipe charging delay; and a dynamic EGR ratio judging means for comparing a difference between the estimated dynamic EGR ratio and the target EGR ratio and prohibiting diagnosis if the absolute difference between the estimated dynamic EGR ratio and the target EGR ratio is higher than a specified value.

The present invention also provides a failure diagnosis apparatus for an exhaust gas recirculation system, which, equipped with a suction pipe pressure detecting means for detecting the suction pipe pressure of an internal combustion engine and an operating condition detecting means for detecting the operating condition of the internal combustion engine, diagnoses a failure of the exhaust gas recirculation system of the internal combustion engine on the basis of the detected suction pipe pressure and operating condition; comprising a failure detecting means for executing diagnosis multiple times, and determining the diagnostic result as failure when the number of failure judgments has reached a specified number or determining the diagnostic result as normality when the number of normality judgments has reached a specified number.

The present invention also provides a failure diagnosis apparatus for an exhaust gas recirculation system, which, equipped with a suction pipe pressure detecting means for detecting the suction pipe pressure of an internal combustion engine and an operating condition detecting means for detecting the operating condition of the internal combustion engine, diagnoses a failure of the exhaust gas recirculation system of the internal combustion engine on the basis of the detected suction pipe pressure and operating condition; comprising a purge valve shutting means for shutting an evaporator purge valve and executing re-diagnosis when a failure judgment is made as a result of the diagnosis.

BRIEF DESCRIPTION OF DRAWINGS

FIG. 2 is a timing chart showing the most fundamental principle of diagnosis;

FIG. 3 is a timing chart showing an example of disturbance by other valves than EGR valve;

DESCRIPTION OF THE INVENTION:

A preferred embodiment of a failure diagnosis apparatus for an exhaust gas recirculation system of the present invention is explained hereunder, using figures.

Figure 18:
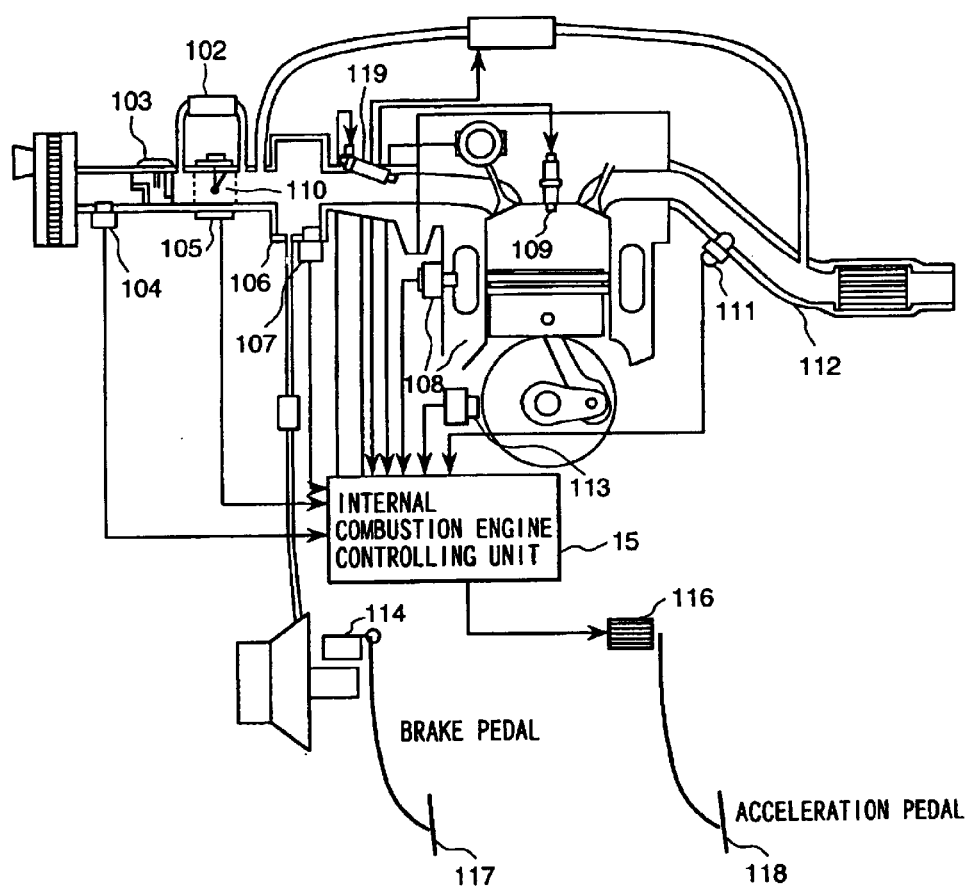
FIG. 18 is an overall configuration diagram showing an internal combustion engine system equipped with a preferred embodiment of a failure diagnosis apparatus for an exhaust gas recirculation system of the present invention.
Figure 19:
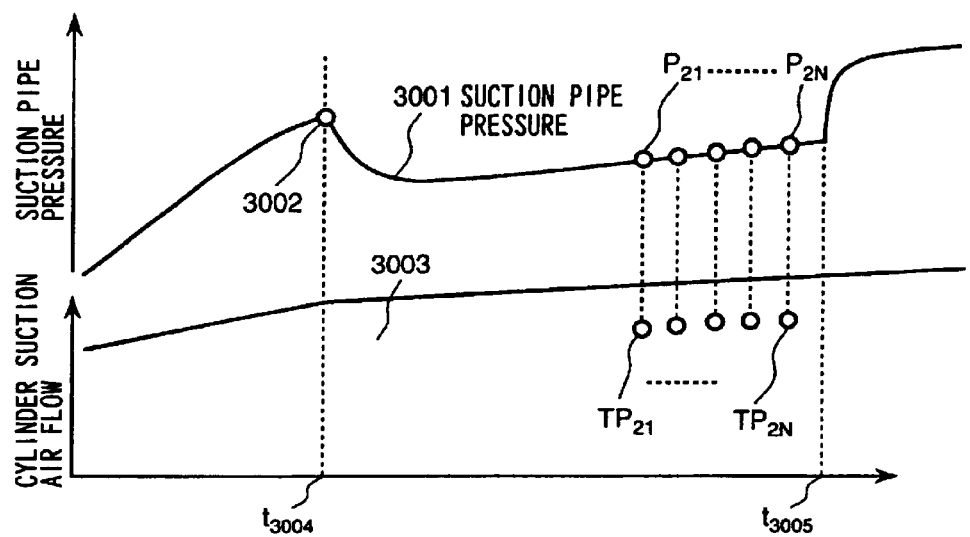
FIG. 19 is a timing chart showing a method of correction of an estimated suction pipe pressure.

FIG. 18 shows an overall structure of an internal combustion engine system equipped with a preferred embodiment of a failure diagnosis apparatus for an exhaust gas recirculation system of the present invention. The system consists of an internal combustion engine, suction system, and exhaust system. The internal combustion engine is equipped with an igniter 109, fuel injection system 119, and speed detecting means 113. The suction system is equipped with an air cleaner, suction air temperature detecting means 104, air flow detecting means 103, and suction pipe pressure detecting means 107. The exhaust system is equipped with an air/fuel ratio sensor 111 and catalytic converter rhodium.

An internal combustion engine controlling unit 115 finds a ring gear or plate speed Ne from an output signal Qa of the air flow detecting means 103 and the speed detecting means 113, calculates a fuel injection Ti, and controls the injection from the fuel injection system.

The internal combustion engine controlling unit 115 detects from the air/fuel ratio sensor 111 an air/fuel ratio inside the internal combustion engine and performs an air/fuel ratio feedback control for compensating the fuel injection Ti so that the air/fuel ratio inside the internal combustion engine becomes a theoretical air/fuel ratio. In addition, when the exhaust gas containing $CO_2$ gas, which has greater heat capacity than $N_2$ in the air, is mixed in the air-fuel mixture to an appropriate level, combustion temperature can be controlled lower, even if the combustion is to produce the same heating value, and accordingly generation of NOx can be controlled less than in a case using no exhaust gas mixture. This is called exhaust gas recirculation (EGR), which is realized by the internal combustion engine controlling unit 115 by controlling an EGR valve 101.

The preferred embodiment of the failure diagnosis apparatus for an exhaust gas recirculation system of the present invention aims to detect a failure of the EGR system so as to prevent continuous use of the EGR system which has failed and NOx discharge has increased.

It would be a possible way for diagnosing an EGR gas flow that the EGR is forced to shut down under the EGR working, an EGR pressure PEGR is calculated from a difference between the suction air pressures before and after the shut-down, and the EGR flow is determined from the difference of the pressure. In doing this, however, other gases than the EGR gas flow into the suction pipe from a throttle valve 110 and a purge control valve (not shown).

Because of this, if an operator steps on the accelerator at point 404 after the EGR is shut down at point 402 and the air flow from the throttle valve increases, a differential pressure measured at a timing of point 403 will be like PEGR2 and the actual EGR pressure PEGR cannot be measured.

To prevent this, it will be an idea that the EGR is forced to shut down when the opening of other valves than the EGR valve is consistent and then the differential pressure is measured. When an internal combustion engine is operating, however, such a state rarely happens that the opening of each valve is consistent and therefore frequent diagnosis is not available.

Figure 4:
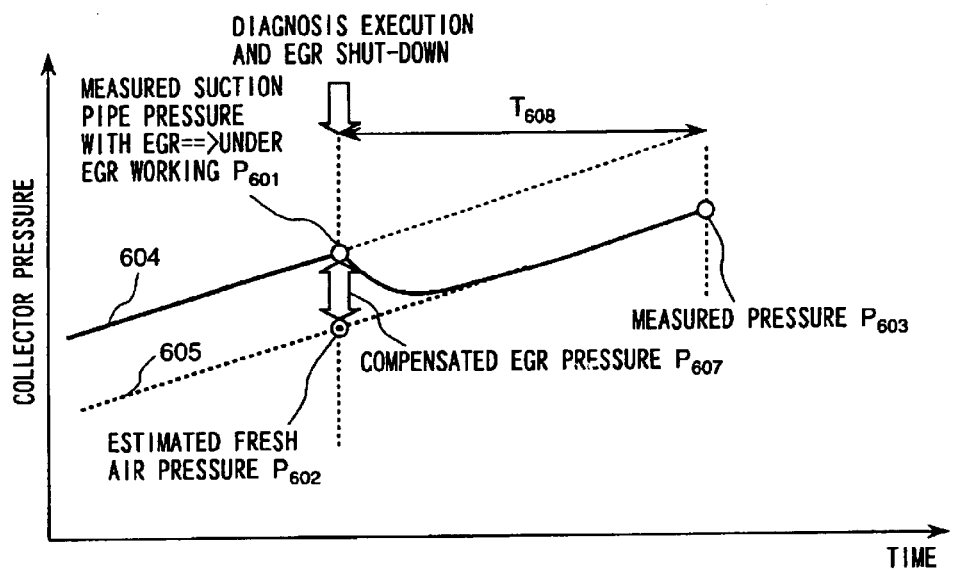
FIG. 4 is a timing chart showing a method of estimating an RGR pressure.

Thus, it is an effective way for diagnosing the EGR flow by finding an EGR pressure P607 by estimating a pressure of the incoming gases into the suction pipe through other valves than the EGR valve, i.e. fresh air pressure 602, and deducting it from the measured suction pipe pressure P601 under the EGR working as shown in FIG. 4

Figure 20:
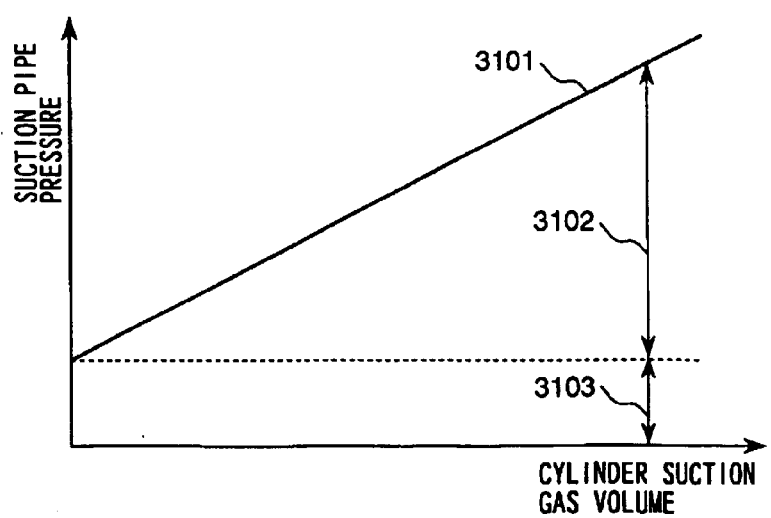
FIG. 20 is a chart showing the relationship between cylinder suction gas flow and suction pipe pressure.

The suction pipe pressure 3101 can be expressed as a sum of a residual gas pressure P3103 and a pressure P3102 proportional to the cylinder suction gas volume as shown in FIG. 20. The residual gas pressure 3101 is a pressure caused by the gas remaining inside the cylinder after completion of an exhaust stroke, and the pressure varies depending upon the atmospheric pressure, suction air flow and engine speed.

The cylinder suction gas volume proportional pressure is a pressure proportional to a volume of incoming gas into the cylinder per suction stroke, and the proportional factor depends on the engine speed.

Figure 6:
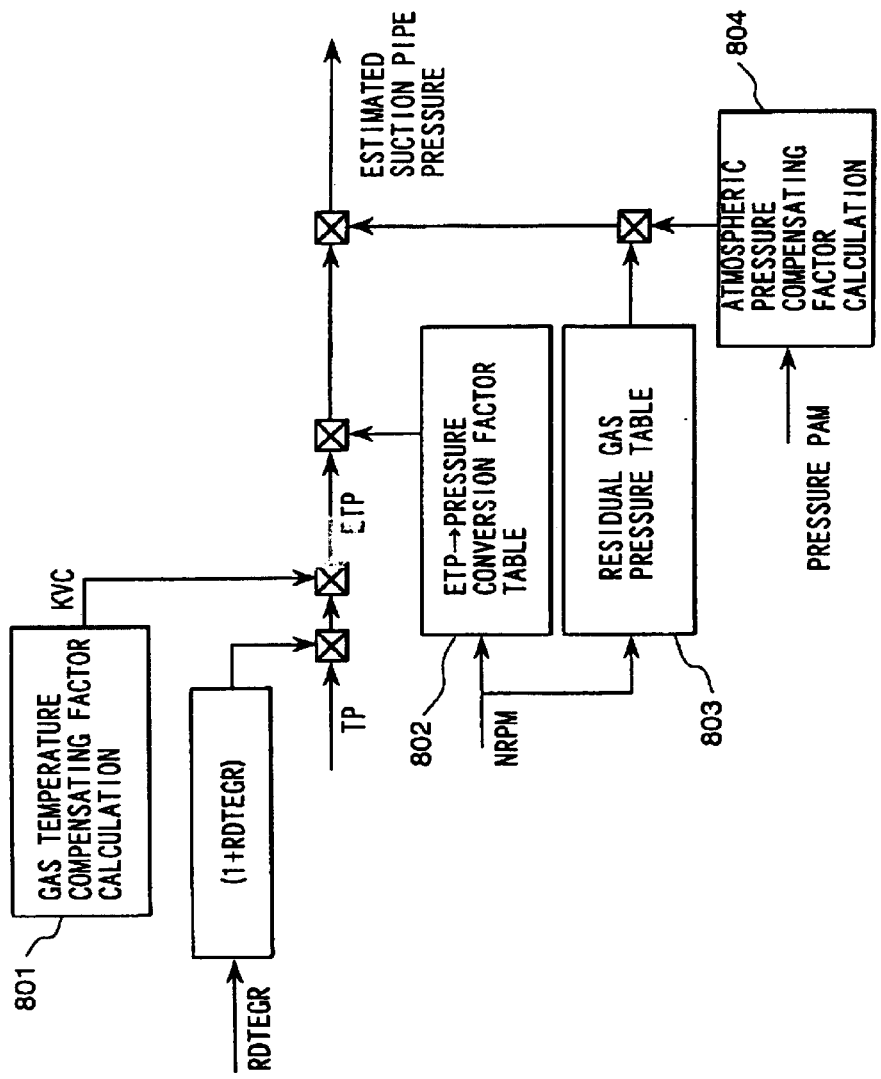
FIG. 6 is a block diagram showing a calculation of suction pipe pressure.
Figure 7:
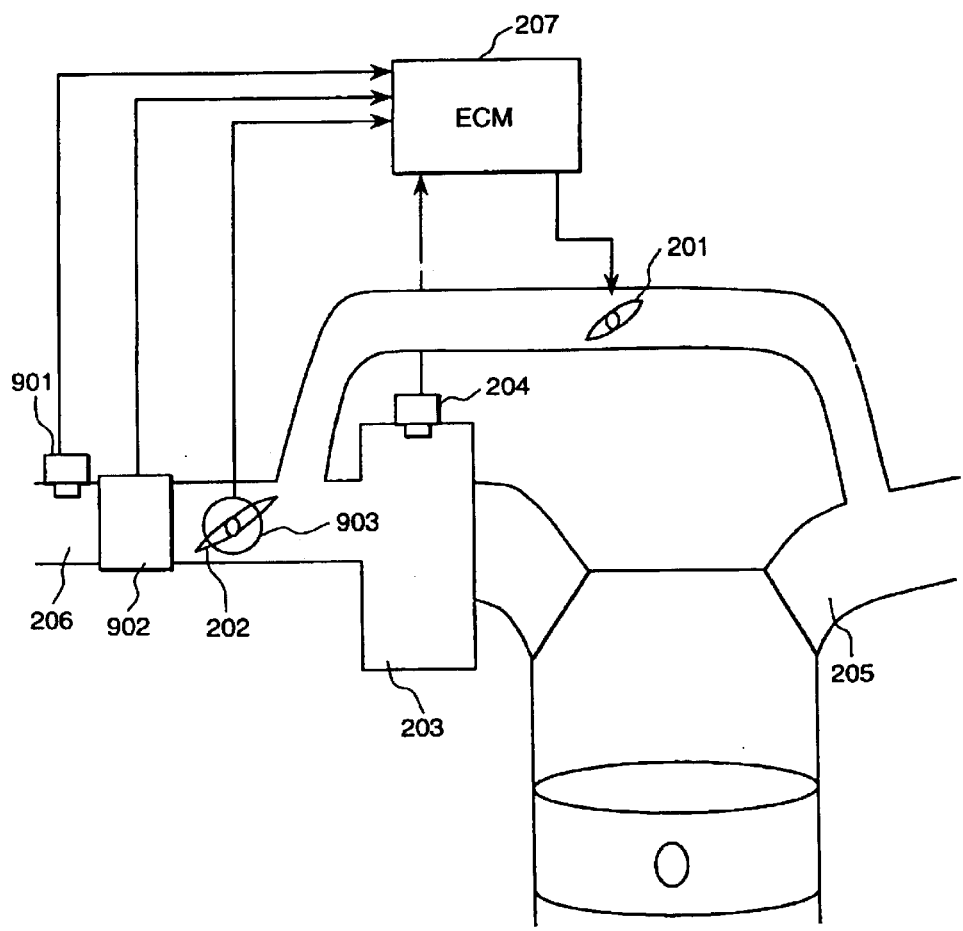
FIG. 7 is a brief sketch showing a conventional EGR flow diagnosing apparatus.

Pressure components of the fresh air pressure are calculated by a fresh air pressure calculating means 2911, whose process blocks are shown in FIG. 6.

The estimated cylinder suction gas volume proportional pressure is obtained by multiplying a volumetric flow ETP, which is obtained by multiplying a cylinder suction fresh air mass TP per suction stroke by a gas thermal compensation factor KVC calculated in block 801, by a proportional factor searched in block 802 in reference to the engine speed.

The estimated cylinder suction gas volume proportional pressure under the EGR working is obtained by a similar calculation in the EGR gas pressure estimating means by substituting the EGR ratio for RDTEGR of FIG. 6.

Figure 5:
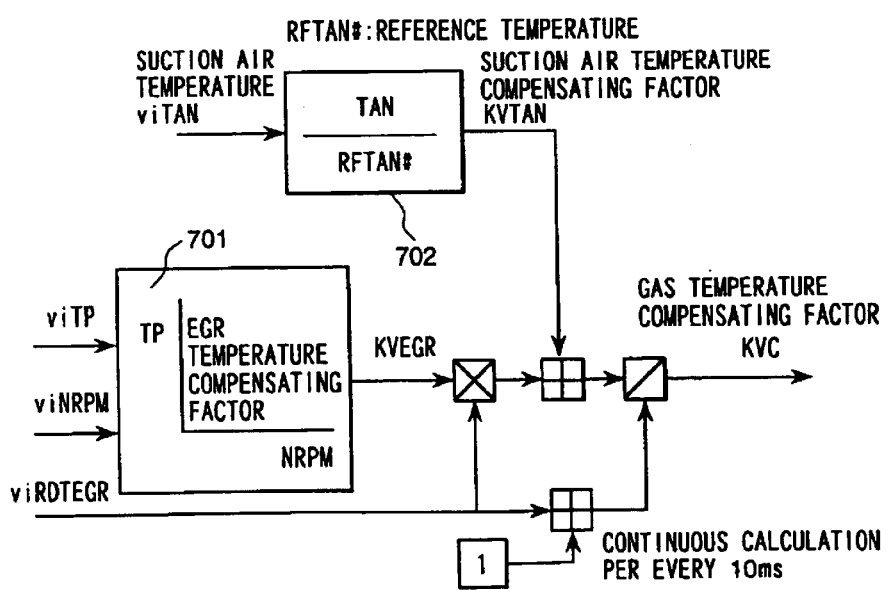
FIG. 5 is a block diagram showing a calculation of suction pipe gas temperature.

The gas thermal compensation factor KVC is calculated in an estimated pressure thermal compensating means 2915. The gas thermal compensation factor KVC is a multiplier of the suction pipe gas temperature (absolute) over the suction pipe gas reference temperature RFTAN (absolute). In calculating a fresh air pressure, as shown in FIG. 5, the factor is calculated as a multiplier KVTAN of the measured suction air temperature TAN over the suction pipe gas reference temperature RFTAN because the EGR ratio RDTEGR=0% holds true.

In calculating a suction air pressure including the EGR pressure, a multiplier of a suction pipe mixture gas average temperature over RFTAN is calculated from the multiplier KVEGR of the EGR gas temperature (absolute) over the suction pipe gas reference temperature RFTAN (absolute), multiplier KVTAN and EGR ratio RDTEGR, and substituted for KVC.

The multiplier KVEGR of the EGR gas temperature (absolute) over the suction pipe gas reference temperature RFTAN (absolute) is obtained by searching in a map in reference to the cylinder suction air flow TP and engine speed NRPM.

The residual gas pressure is obtained by searching the residual gas pressure under the reference atmospheric pressure RFPAM in reference to the engine speed and compensating the result with an atmospheric pressure detected by the atmospheric pressure detecting means.

An estimated suction pipe pressure Pe is calculated from a sum of the cylinder suction gas volume proportional pressure and residual gas pressure obtained through the above steps.

It is possible to obtain an estimated suction pipe pressure from the above calculation, but in reality, the estimated suction pipe pressure is not consistent with the measured pressure because each atmospheric sensor, suction air temperature sensor, and suction pipe pressure sensor produces its own error.

Because of the above, it is necessary to correct the estimated pressure so as to absorb influence of each error and maintain the accuracy of diagnosis.

The estimated pressure is corrected in the estimated fresh air pressure correcting means 2911, where the parameters used in calculating the estimated pressure are so corrected that the measured suction pipe pressure becomes consistent with the estimated suction pipe pressure under the EGR not working.

Figure 17:
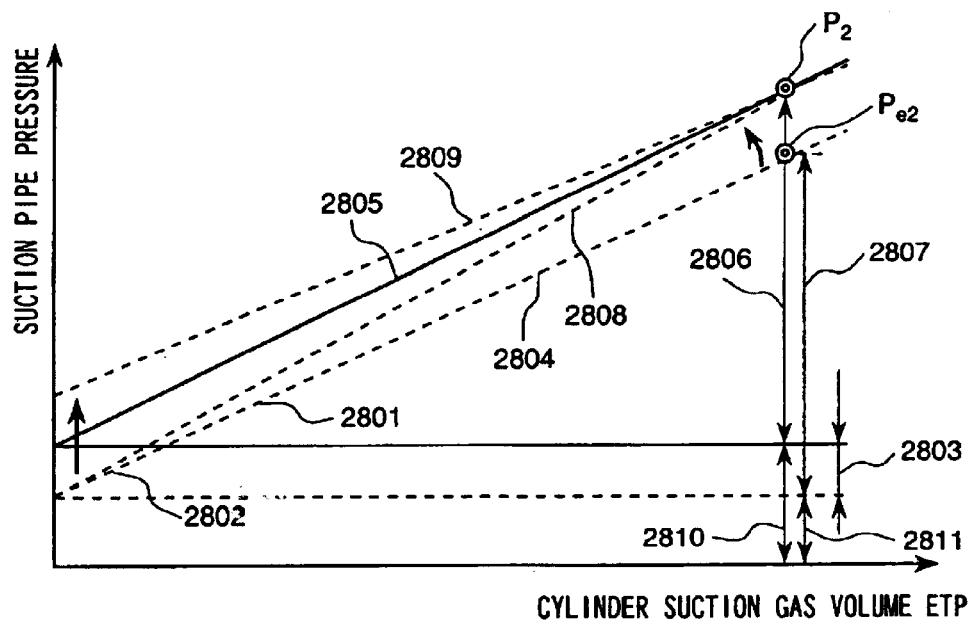
FIG. 17 is a chart showing a method of correction of a suction pipe pressure estimating means.

As described above, because the suction pipe pressure is expressed as a linear function of the cylinder suction gas volume ETP as shown in FIG. 17, the estimated pressure can be corrected, and hence the calculated suction pipe pressure can be corrected, by adjusting either a gradient or an intercept, or both of an estimated pressure line 2804.

In case of adjusting a gradient, adjust the gradient and obtain an estimated pressure line 2808 so that the volumetric flow proportional pressure 2807 of the estimated pressure becomes equal to the cylinder suction gas volume proportional pressure 2806 obtained by deducting a recognized residual gas pressure 2810 from the measured pressure P2.

In case of adjusting an intercept, move the estimated pressure line 2804 in parallel and obtain an estimated pressure line 2809 so that the estimated pressure Pe2 becomes equal to P2.

In case of adjusting both gradient and intercept, calculate the gradient and intercept by least squares of the suction pipe pressure weighted mean P21 . . . P2N, cylinder suction air flow TP21 . . . TP2N, and suction pipe pressure weighted mean P21 . . . P2N and cylinder suction air flow TP21 . . . TP2N, and obtain an estimated pressure line.

As described above, correcting the suction pipe pressure calculation enables to estimate the suction pipe pressure with high precision.

As a result, using the estimated pressure and the measured suction pipe pressure under the EGR working, it becomes possible to estimated the EGR pressure precisely and diagnose the EGR flow precisely in the actual EGR gas pressure compensating means 2909.

An example of an EGR flow diagnosis apparatus that has realized the above is shown in FIG. 18. The apparatus comprises a suction pipe pressure detecting means 107, suction air flow detecting means 103, suction air temperature detecting means 104, atmospheric pressure detecting means (not shown), engine speed detecting means 113, engine water temperature detecting means, throttle valve opening detecting means 105, bypass valve opening area detecting means (not shown) installed on a path bypassing the throttle valve, and internal combustion engine controlling unit 115.

Figure 1:
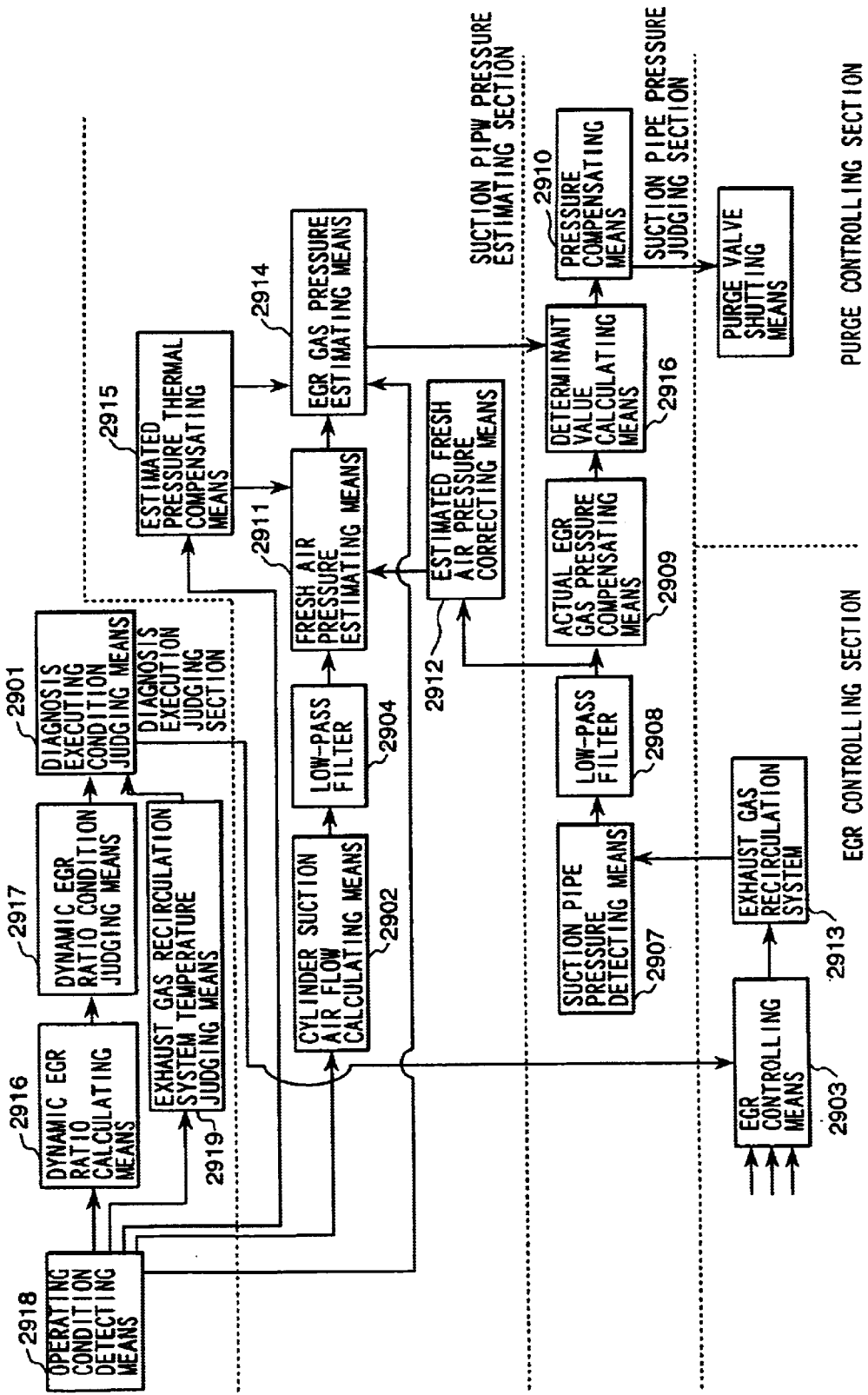
FIG. 1 is a functional block diagram showing the processes performed inside a control unit including a preferred embodiment of a failure diagnosis apparatus for an exhaust gas recirculation system of the present invention.

FIG. 1 shows a functional block diagram of the processes inside the internal combustion engine controlling unit 115 including a preferred embodiment of a failure diagnosis apparatus for an exhaust gas recirculation system of the present invention. The unit consists of a diagnosis execution judging section, suction pipe pressure estimating section, and suction pipe pressure judging section. The diagnosis execution judging section judges whether diagnosis can be executed under the present operating condition.

The suction pipe pressure estimating section consists of a cylinder suction air flow calculating means 2902, low-pass filter 2904 for eliminating a suction pulse component contained in the calculated cylinder suction air flow, fresh air pressure estimating means 2911 for estimating a fresh air pressure from the filtered cylinder suction air flow and an engine speed, EGR gas pressure estimating means 2914 for estimating an EGR gas pressure, which is supposed to be generated when the exhaust gas recirculation system is not faulty, on the basis of the filtered cylinder suction air flow, engine speed and EGR ratio in an EGR controlling means 2903, and estimated pressure thermal compensating means 2915 for compensating the estimated fresh air pressure and estimated EGR gas pressure with the engine suction air temperature and EGR ratio in the EGR controlling means 2903. It further comprises an estimated fresh air pressure correcting means 2912 for correcting the parameters of the fresh air pressure estimating means 2911 when very little EGR is working.

On the other hand, the suction pipe pressure judging section consists of a suction pipe pressure detecting means 2907, low-pass filter for eliminating a pulse component contained in the detected suction pipe pressure, actual EGR gas pressure compensating means 2909 for calculating the EGR gas pressure by deducting the estimated fresh air pressure from the suction pipe pressure processed through the low-pass filter 2908, determinant value calculating means 2916 for calculating a determinant value for making a failure judgment of the EGR system by comparing the estimated EGR gas pressure with the compensated actual EGR gas pressure, and failure judging means 2910 for judging a failure of the exhaust gas recirculation system on the basis of the determinant value.

Figure 15:
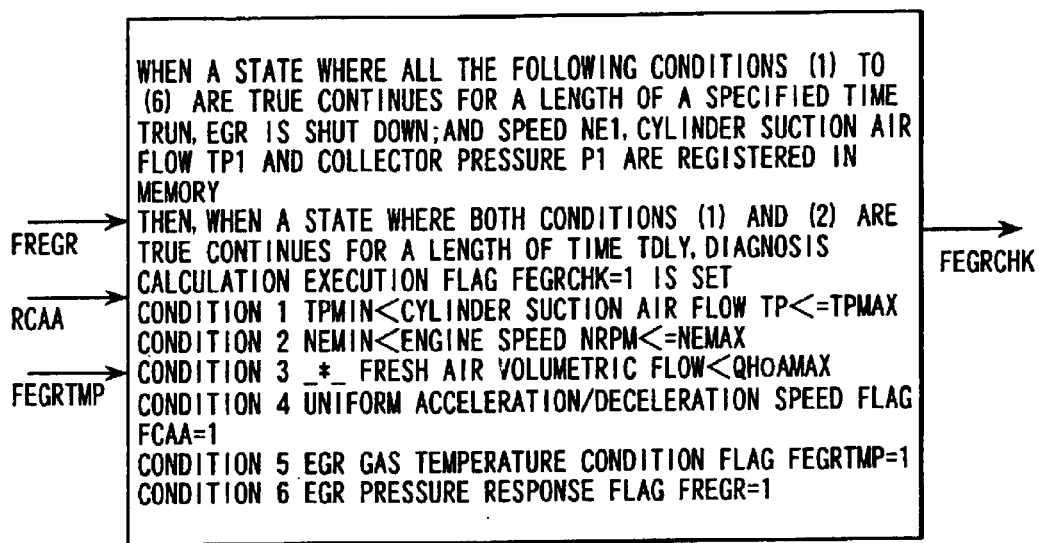
FIG. 15 is a block diagram showing a judgment of diagnosis execution condition.
Figure 16:
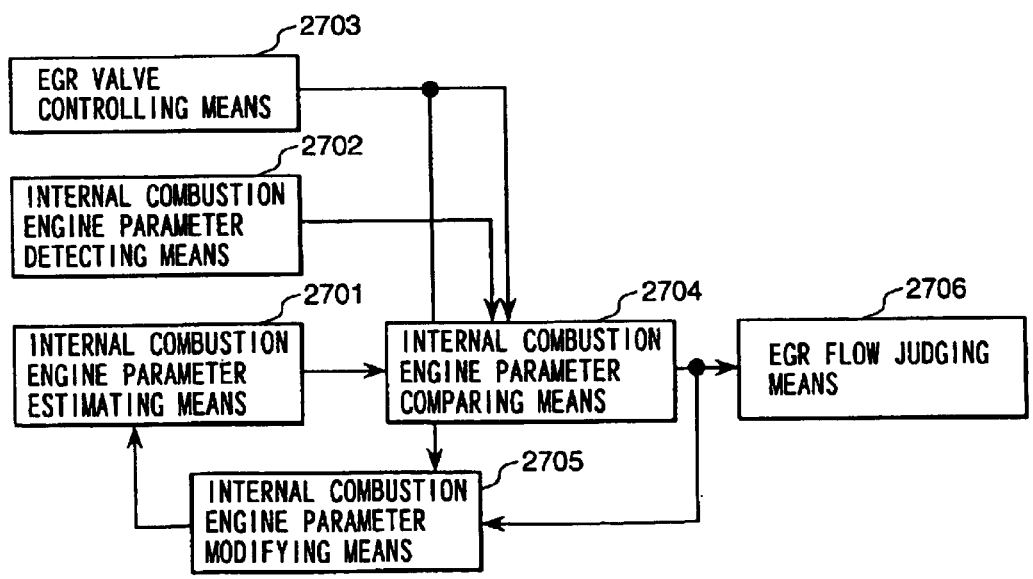
FIG. 16 is a functional block diagram showing a conventional failure diagnosis apparatus for an exhaust gas recirculation system.

A process flow from the start of diagnosis to the determination of diagnostic result is explained hereunder. In the diagnosis execution judging means 2901, the suction pipe pressure is registered and a flag FEGRCHK for shutting down the EGR is set to "1" when all the conditions 1 through 6 shown in FIG. 15 are met.

Conditions 1 and 2 are for judging whether both engine speed NRPM and cylinder suction air flow TP are within a range available for diagnosis so as to limit the execution of diagnosis to an operation range where the influence of the EGR flow over the suction pipe pressure is significant.

Condition 3 judges whether an operating point moving speed is within a range available for diagnosis. If the operating point moving speed is excessive, an operating point for the correction of the suction air pressure estimating means 2911 shifts remarkably from an operating point for actually estimating the pressure, and consequently the accuracy of estimation deteriorates. Hence, this condition prohibits diagnosis when the operating point moving speed is greater than a specified value. The operating point moving speed is judged on the basis of whether the variation of the cylinder suction fresh air flow TP per unit time is less than the maximum available for diagnosis.

The judgment under condition 3 can be made also by judging whether the variable acceleration of the suction pipe pressure, obtained by searching in a table in reference to the ratio of a sum of the opening areas of the valves for adjusting the incoming gas flow into the suction pipe over the engine speed, is less than the maximum available for diagnosis.

The execution of diagnosis can be limited to a condition suitable for the execution as described above. Even if the conditions 1 to 3 have changed from "Not True" to "True" state at time 3303, however, it is necessary to wait for the convergence of response delay for a certain length of time because there occurs an influence by a suction pipe charging delay or a delay due to low-pass filter 2908 in practice. A judgment delay time TWAIT is provided for this purpose. After TWAIT has elapsed, the suction pipe pressure PRG1, cylinder suction air flow ATP1, engine speed NE1, and dynamic EGR ratio RDTEGR1 are registered, and then the EGR is shut down for the correction of the suction air pressure estimating means.

A wait time for a specified length of time TCUT is provided after the EGR is shut down in order to wait for the convergence of the response delay of the EGR pressure. After that, the suction pipe pressure PRG2, engine speed N2 and cylinder suction air flow ATP2 are registered, and then the EGR is released from shut-down.

After the EGR is released from shut-down, correction of the fresh air pressure calculating means 2911 is performed so that the calculated pressure becomes consistent with PRG2 as described above, and then the estimated suction pipe pressure PEG1 and estimated fresh air pressure PEA1 before the EGR shut-down are calculated by the corrected suction pipe pressure calculating means from the suction air temperature TAN and the dynamic EGR ratio RDTEGR1, suction pipe pressure PRE1, cylinder suction air flow ATP1 and engine speed NE1, all registered before the EGR shut-down.

The estimated EGR gas pressure PEE1, which is supposed to be generated when the exhaust gas recirculation system is not faulty, is calculated by the EGR gas pressure estimating means 2914 on the basis of the estimated suction pipe pressure PEG1 under the EGR working and estimated suction pipe pressure PEA1 under the EGR not working obtained as above.

On the other hand, in the actual EGR gas pressure compensating means 2909, a pressure (compensated actual EGR gas pressure PRE1) corresponding to the EGR gas pressure in the measured suction pipe pressure PRG1 is calculated from the measured suction pipe pressure PRG1 under the EGR working and estimated suction pipe pressure PEA1 under EGR not working.

Next, in the determinant value calculating means 2916, a determinant value for judging whether the actual EGR ratio is equal to an expected value is calculated by comparing the estimated EGR gas pressure PEE1 with the compensated actual EGR gas pressure PRE1, and then, in the failure judging means 2910, a failure of the exhaust gas recirculation system is judged on the basis of the determinant value.

Processes in the failure judging means 2910 are as follows.

First, the compensated actual EGR gas pressure is divided by the estimated EGR gas pressure to obtain a determinant value D. Since this value becomes smaller if the EGR flow is poor, the EGR flow is judged abnormal and a failure detecting counter CNG is designed to be given an increment when this value is less than a threshold DMAX.

Figure 14:
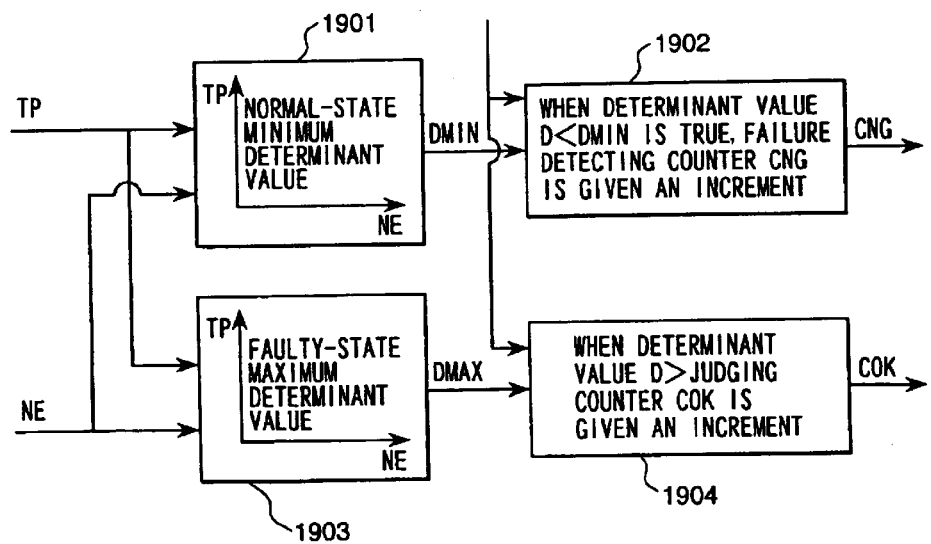
FIG. 14 is a block diagram showing an EGR flow judging section.

However, since the emission resolution on the EGR is different in each operation region, the threshold DMAX for making a judgment is designed to be provided in the form of a map for each operation region as shown in FIG. 14.

In making a normality judgment, for the same reason as above, a normal-state minimum DMIN for the determinant value D is set in the form of a map for each operation region, and if the determinant value D is greater than this minimum, the EGR flow is judged normal and a normality detecting counter COK is given an increment.

Figure 23:
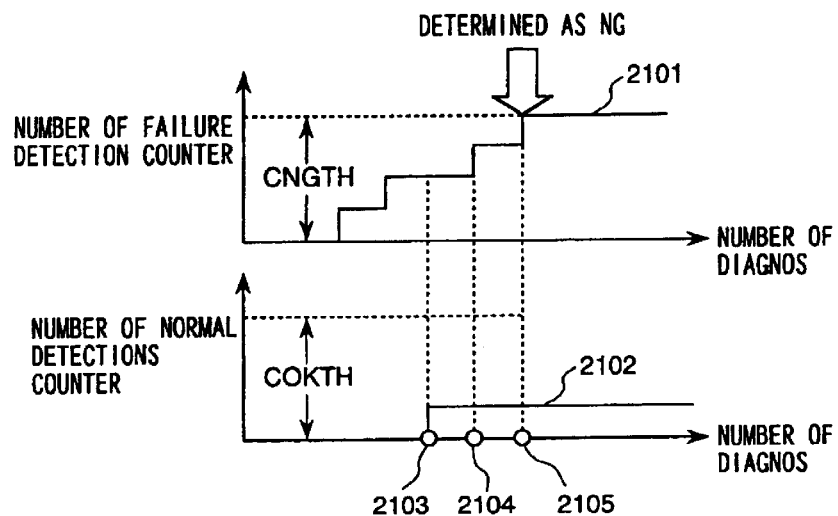
FIG. 23 is a timing chart showing a method of determining diagnosis result through multiple times of diagnosis.
Figure 24:
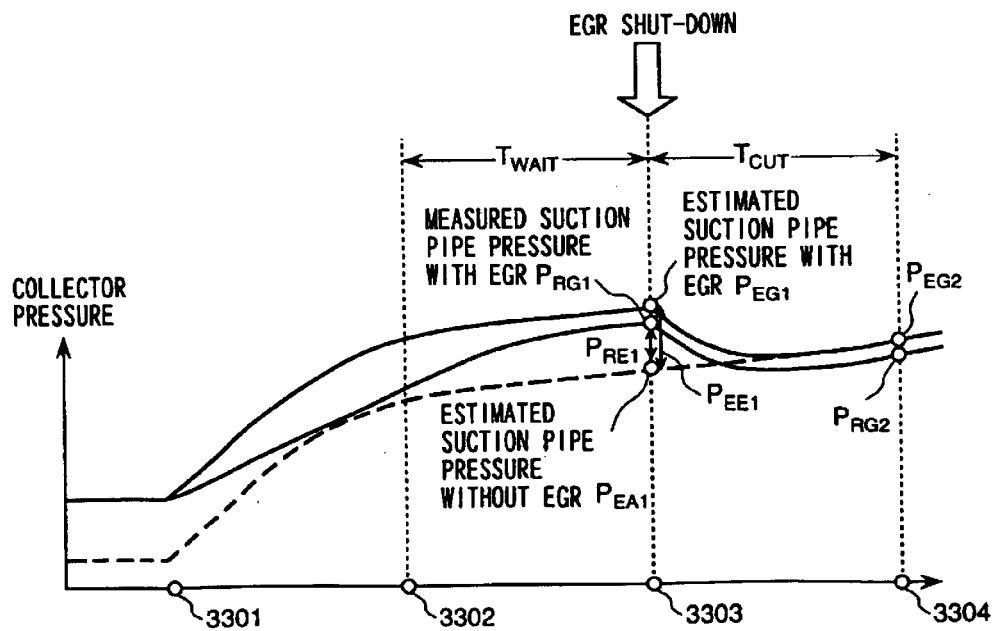
FIG. 24 is a timing chart showing a timing of start of diagnosis.

It is so designed that diagnosis is performed several times in the same flow and, when the failure detecting counter CNG has reached its threshold CNGTH or the normality detecting counter COK has reached its threshold COKTH, the result of the diagnosis is determined as shown in FIG. 23. With this design, the influence of an error such as suction pipe pressure pulses that vary by time is reduced and the accuracy of diagnosis is improved.

Figure 22:
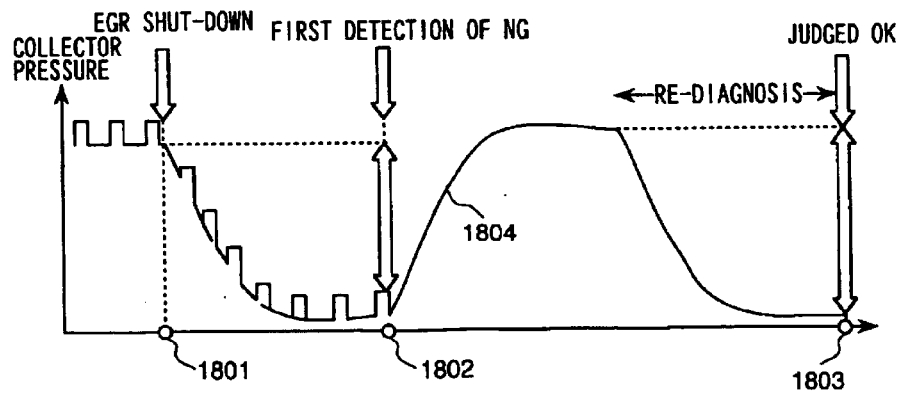
FIG. 22 is a timing chart showing a timing of purge valve shut-down during EGR diagnosis.

Besides, in the purge valve controlling means 2813, if the failure detecting counter CNG exceeds 1, it is designed to prohibit purging in preparation for the second and further diagnosis as shown in FIG. 22 so as to prevent suction pipe pressure pulse caused by the influence of purge and realize high-precision diagnosis. Since meaningless stoppage of purging under normal EGR flow condition is eliminated by this design, insufficient purge gas discharge caused by diagnosis can be minimized.

Figure 21:
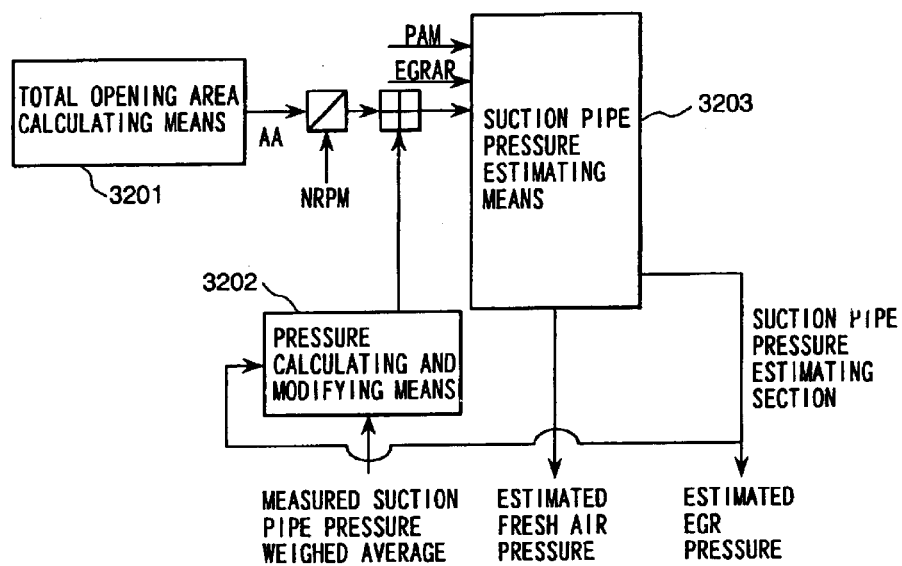
FIG. 21 is block diagram showing another preferred embodiment of a suction pipe pressure estimating section.

Besides, the suction pipe pressure estimating section can be so designed as to estimate the suction pipe pressure from a total sum AA of the opening areas of the valves for adjusting the incoming air flow into the suction pipe, EGR valve opening area, engine speed NRP, and atmospheric pressure PAN as shown in FIG. 21.

In the suction pipe pressure estimating means 3203, the estimated fresh air pressure PEA1 is obtained by searching in a standard-state equivalent pressure table in reference to the ratio of the total opening area AA over the engine speed NRPM and compensating with the atmospheric pressure PAM. The suction pipe pressure including the ERG gas pressure is obtained by searching in a standard-state equivalent pressure table in reference to the ratio of a sum of the fresh air total opening area AA and EGR gas opening area EGRAR over the engine speed.

The correction of the suction pipe pressure estimating means 3203 is performed by calculating a difference DAA between an estimated fresh air total opening area EAA and a recognized total opening area AA, where EAA is obtained by searching in a table in reference to the ratio of a standard-state equivalent suction pipe pressure, calculated from the measured suction pipe pressure under the EGR not working and the atmospheric pressure PAM, over the engine speed, and then compensating the recognized total opening area AA by DAA.

The basic structure and operation of a preferred embodiment of a failure diagnosis apparatus for an exhaust gas recirculation system of the present invention has already been explained above. In performing a diagnosis on a vehicle in practice, however, there happens a case where the diagnosis is prohibited because, for example, the outside temperature or engine water temperature is too low. Necessary structure for the purpose is explained hereunder.

In the diagnosis execution condition judging means 2901, in addition to the above-mentioned conditions 1 to 3, there is provided an EGR gas temperature condition flag FREGR which indicates the EGR gas temperature is within a specified range when its value is "1", an operating point movement condition flag FCAA which indicates a condition for permitting the diagnosis in terms of the variable acceleration of the operating point movement when its value is "1", and an EGR pressure response flag FREGA which indicates the dynamic EGR ratio (EGR ratio-compensated with suction pipe charging delay) has reached nearly equal to the target EGR ratio when its value is "1" as shown in FIG. 15, and when all three flags are set to "1", the diagnosis permission condition true flag FEGRCHK is set to "1".

Figure 8:
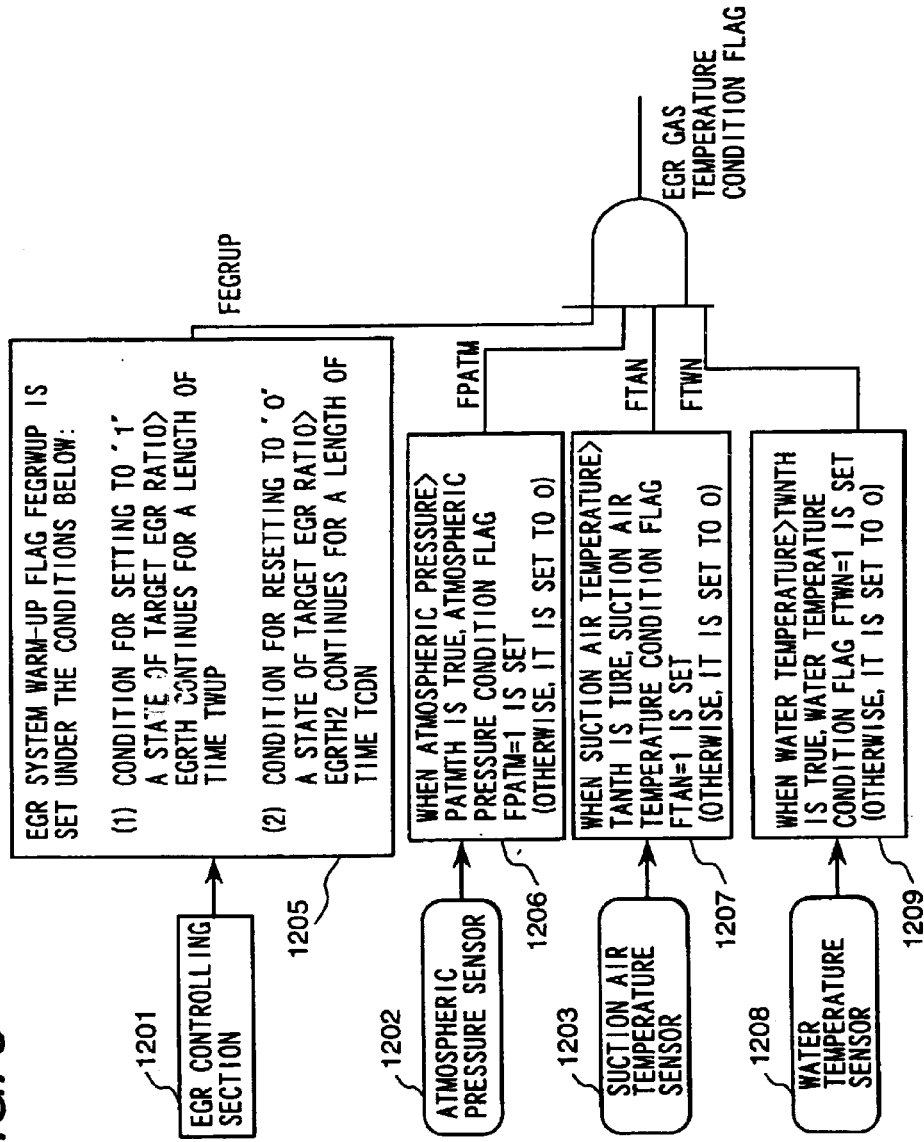
FIG. 8 is a block diagram showing an EGR gas temperature condition judging section.
Figure 9:
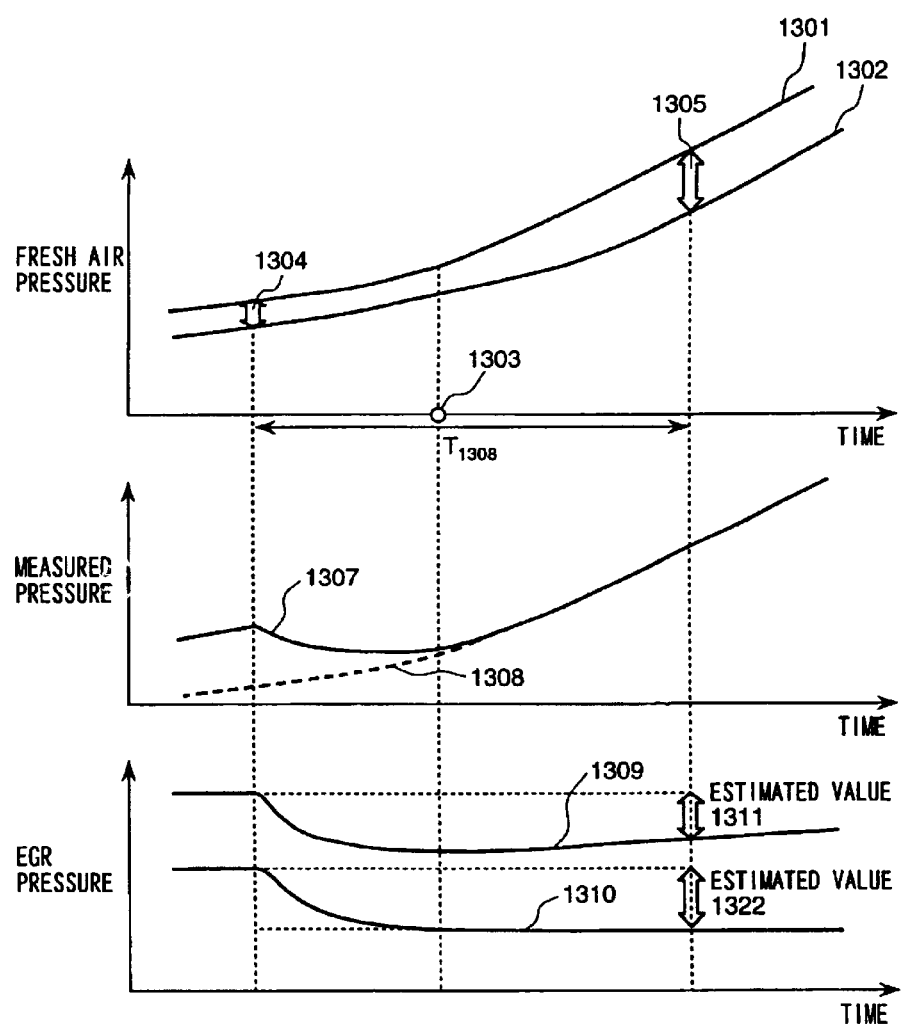
FIG. 9 is a timing chart showing the influence of delay caused by filtering process of cylinder suction air flow.

The EGR gas temperature condition flag FREGR is calculated so as to be set to "1" when the EGR system warm-up flag FEGRWUP, atmospheric pressure condition flag FPATM, suction air temperature condition flag FTAN, and water temperature condition flag FTWN are all set to "1" as shown in FIG. 8.

The EGR system warm-up flag FEGRWUP, which is provided in order to prevent diagnosis in case that heat of the EGR gas is absorbed by the piping and consequently the EGR gas at lower temperature is circulated because the EGR system has not yet been warmed up, is calculated in block 1205. If a condition where the target EGR ratio is greater than a specified value EGRTH continues for a specified length of time TWUP, the EGR system is judged to have been warmed up in block 1205 and FEGRUP=1 is set. On the contrary if a condition where the target EGR ratio is lower than a specified value EGRTH2 continues longer than a specified length of time TCDN, the EGR system is judged to have not yet been warmed up and FEGRUP=0 is set.

This block 1205 can be substituted for by an EGR gas temperature judging means where FEGRUP=1 is set when the EGR gas temperature detecting means and detected EGR gas temperature are greater than a specified time.

The atmospheric pressure condition flag FPATM, which is provided in consideration that the exhaust gas temperature may decrease as a pumping loss in the suction stroke decreases under a condition of lower atmospheric pressure, is calculated in block 1206. In block 1206, if the atmospheric pressure is lower than a specified value PATMTH, the exhaust gas temperature is judged lower than a level available for diagnosis and FPATM=0 is set. Otherwise, FPATM=1 is set.

The suction air temperature condition flag FTAN, which is provided in order to prevent diagnosis in case that the exhaust gas temperature becomes lower because of lower suction air temperature, is calculated in block 1207. In block 1207, if the suction air temperature is lower than a specified value, the exhaust gas temperature is judged lower than a level available for diagnosis and RTAN=0 is set. Otherwise, FTAN=1 is set.

The water temperature condition flag FTWN, which is provided in order to prevent diagnosis in case that the exhaust gas temperature becomes lower because of lower engine temperature, is calculated in block 1209. In block 1209, if the water temperature is lower than a specified value, the exhaust gas temperature is judged lower than a level available for diagnosis and FTWN=0 is set. Otherwise, FTWN=1 is set.

The uniform acceleration/deceleration flag FCAA is provided in order to prohibit diagnosis in case that the response delay of a filtering process value of the cylinder suction air flow TP varies because the variable acceleration DDTP of TP varies, and consequently the pressure estimating accuracy becomes lower.

Figure 10:
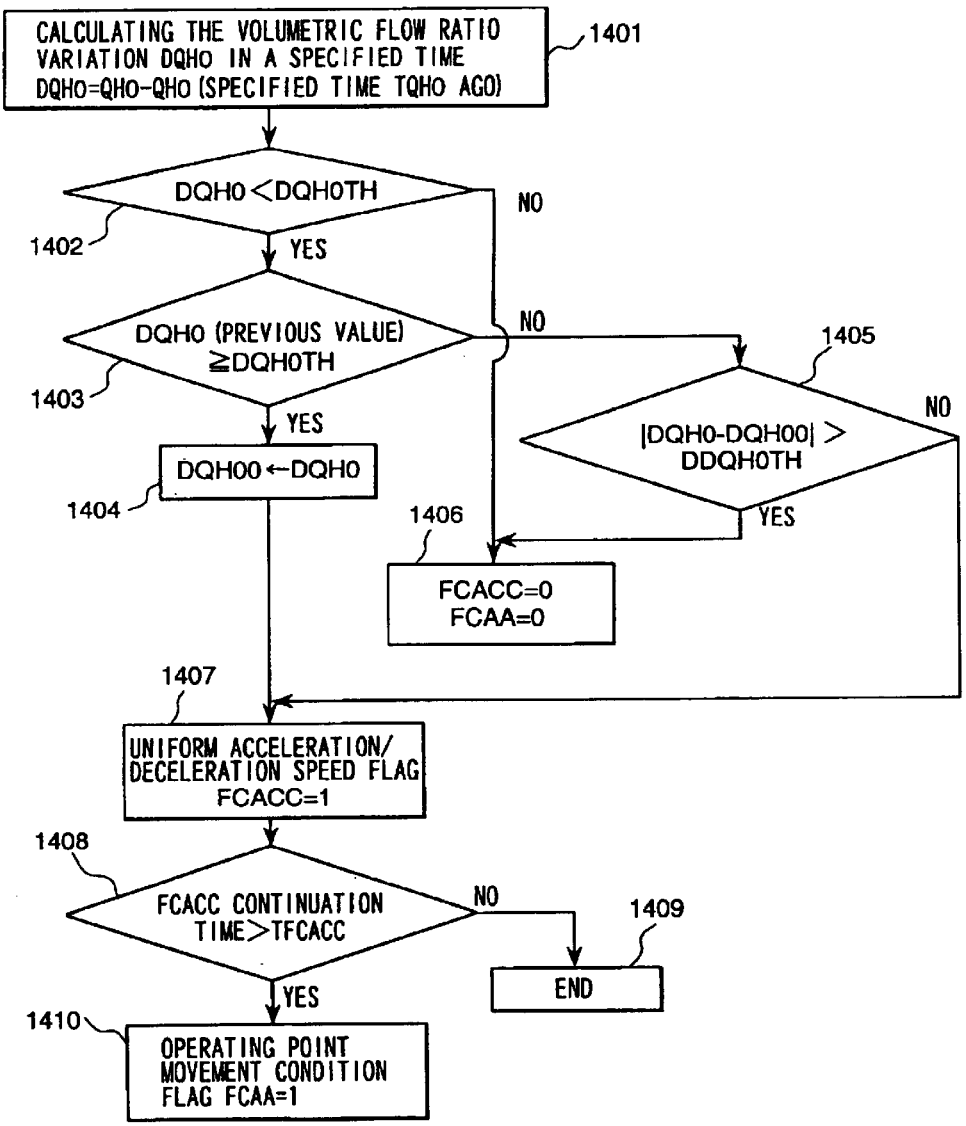
FIG. 10 is a flowchart showing a calculation of an operating point movement condition flag.

Calculation process of FCAA is explained hereunder, using a flowchart in FIG. 10.

In step 1401, a volumetric flow rate variation DQH0 per time TQH0 is calculated from a difference between the volumetric flow QH0 of the gas through the suction pipe and the same QH0 of a specified time TQH0 ago. The volumetric flow QH0 is obtained by searching in a table in reference to the ratio of a sum AA of the opening areas of all valves for adjusting the incoming air flow into the suction pipe over the engine speed.

Next, in step 1402, whether DQH0<specified value DQH0TH is true or not is judged and, if this is not true, a time-based variation ratio of TP is judged outside an allowable range and FCACC=0 is set. At the same time, the operating point movement condition flag FCAA=0 is set. If the above is true, the process moves to step 1403, and whether DQH0<DQH0TH was already true at the previous process is judged. If it was not, the value DQH0 is registered in DQH00 in step 1404 and FCACC=1 is set in step 1407.

In step 1408, whether the continuation time of FCACC=1 is greater than a specified value TFCACC is judged and, if it is judged greater than TFCACC, the operating point movement condition flag FCAA=1 is set on an assumption that the response delay of the TP filtering process value has almost converged to a consistent value, If the previous value DQH0 is judged lower than DQH0TH in step 1403, whether a difference between DQH00, a value of DQH0 at the time when FCACC was first set to 1, and the present DQH0 is greater than a specified value DDQH0TH is judged. If it is, the variation of the response delay of the TP filtering process value is judged outside an allowable range and FCACC=0 is set and the operating point movement condition flag FCAA=0 is set. If it is judged lower than DDQH0TH, the processes in and after step 1407 are performed in a similar manner as above-mentioned.

Figure 11:
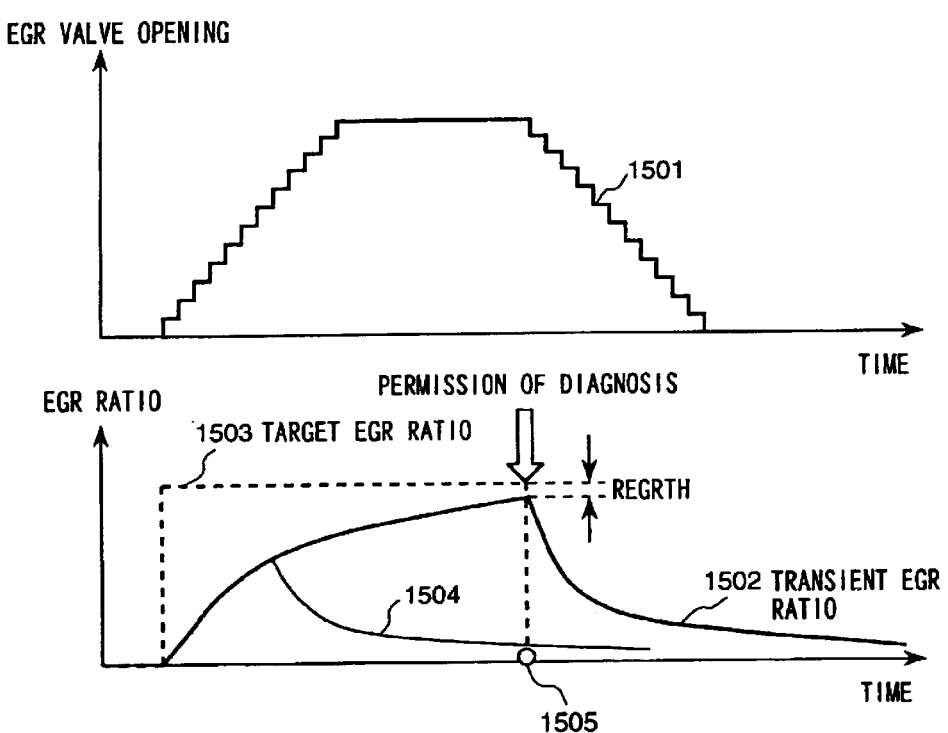
FIG. 11 is a timing chart showing the influence of suction pipe charging-delay of EGR gas.

The EGR pressure response flag FREGR is provided for in order to prohibit diagnosis at a timing when, as shown by step 1504 in FIG. 11, the EGR valve has just opened from a fully closed state and the suction pipe has not yet been sufficiently charged with EGR gas.

Figure 13:
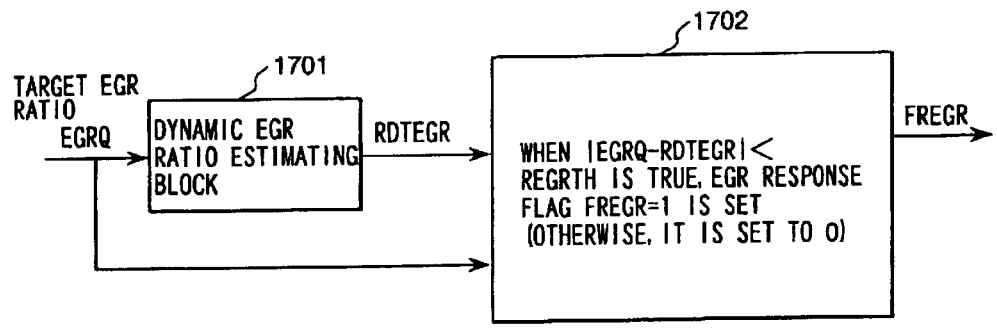
FIG. 13 is a block diagram showing a judgment of EGR system warming-up.

The EGR pressure response flag FREGR is set to 1 only while a difference between the target EGR ratio EGRQ and the transient EGR ratio RDTEGR is lower than a specified value REGRTH as shown in FIG. 13.

Figure 12:
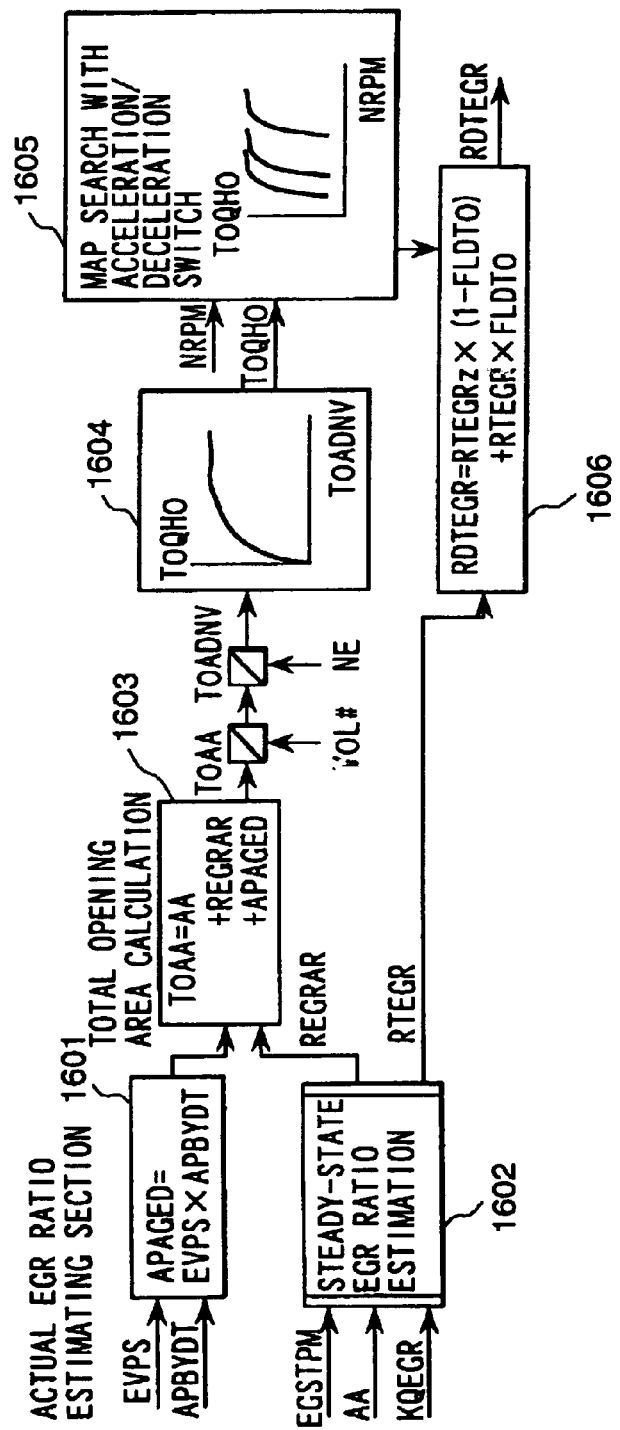
FIG. 12 is a block diagram showing a calculation of EGR ratio compensated with suction pipe charging delay.

The transient EGR ratio RDTEGR is calculated in the blocks shown in FIG. 12. In block 1602, a steady-state EGR ratio RTEGR is calculated from the factor KQEGR for compensating the opening area of the EGR valve according to the exhaust gas temperature and pressure, recognized opening area EGSTPM of the EGR valve, and a sum of opening areas of all valves, excluding the EGR valve, for controlling the incoming gas flow into the suction pipe.

In block 1606, delay of this RTEGR is compensated with a time constant FLDT0 equivalent to the suction pipe charging delay, and the transient EGR ratio RDTEGR is calculated. This time constant FLDT0 equivalent to the suction pipe charging delay is obtained by searching in a map in reference to the volumetric flow rate T0QH0 and engine speed NRPM, where T0QH0 is calculated from the total opening area T0AA, a sum of AA and the EGR valve opening area, and the engine speed NE.

As explained above, since the present invention provides a design capable of eliminating the influence of various disturbances that may vary a suction pipe pressure, it is possible to precisely diagnose a failure of an exhaust gas recirculation system on the basis of the suction pipe pressure.

In particular, since the present invention corrects an estimated pressure on the basis of a detected suction pipe pressure under the EGR not working and obtains an estimated fresh air pressure, the EGR pressure can be precisely estimated from a difference between this pressure and a measured suction pipe pressure and accordingly high-precision diagnosis becomes available.

Besides, since diagnosis is executed only when a condition where the variation of an estimated volumetric flow per time is lower than a specified value has continued for a specified length of time, and since the estimated pressure is corrected and the suction pipe pressure is estimated while the response delay of a filtering process value of the cylinder suction air flow is consistent, the accuracy of diagnosis can be maintained high.

Besides, since diagnosis is prohibited in case that the water temperature, suction air temperature and atmospheric pressure are lower than a specified value and also in case that a condition where the EGR ratio is higher than a specified value has not continued for a specified length of time, and accordingly diagnosis is prohibited when the EGR gas temperature has become lower due to the above factors, wrong diagnosis can be prevented.

Besides, since diagnosis is prohibited in case that a difference between the dynamic EGR ratio and target EGR ratio is greater than a specified value, it is possible to prohibit diagnosis while suction pipe has not yet been charged with the EGR gas sufficiently and prevent wrong diagnosis.

Besides, since diagnosis is performed multiple times and the diagnosis result is determined when the number of failure detections has reached a specified number or the number of normality detections has reached a specified number, it is possible to reduce possible wrong diagnosis due to an error such as suction pipe pressure pulses that vary by time.

Besides, since the purge valve is shut down and diagnosis thereafter is performed without purge valve even in case a failure is detected only one time, it is possible to prevent the influence of suction pipe pulses resulting from purge and realize high-precision diagnosis. Further, since purging is not stopped in normal condition because of the above design, it is possible to prevent insufficient purge gas discharge caused by meaningless stoppage of purging.

What is claimed is:

1. A diagnostic apparatus for diagnosing a failure of an exhaust gas recirculation system of an internal combustion engine, comprising:

a suction pipe pressure detecting means for detecting suction pipe pressure of the internal combustion engine;

an operating condition detecting means for detecting an operating condition of the internal combustion engine;

a determinant value calculating means for calculating a determinant value on the basis of the suction pipe pressure, for judging a failure; and a threshold value calculating means for making a failure judgment based on the determinant value;

wherein a threshold value calculated and used by said threshold value calculating means, to judge said failure corresponds to at least one of engine suction air flow and engine speed detected by the operating condition detecting means.

2. A diagnostic apparatus for an internal combustion engine having an exhaust gas recirculation system, a first device for determining suction pipe pressure, and a second device for determining an operating state of the internal combustion engine, said diagnostic apparatus comprising:

means for calculating a variable value based on section suction pipe pressure determined by said first device;

means for setting a threshold value corresponding to at least one of an engine suction air flow and an engine speed determined by said second device; and means for judging a failure of the exhaust gas recirculation system based on said variable value and said threshold value.

* * * * *